United States Patent
Konishi et al.

(10) Patent No.: US 7,809,877 B2
(45) Date of Patent: Oct. 5, 2010

(54) HOST APPARATUS FOR CONTROLLING MEMORY CARDS WHICH MINIMIZES INTERRUPTION OF WRITING TO MEMORY CARDS

(75) Inventors: Yoshiyuki Konishi, Kyoto (JP); Daisuke Kunimune, Osaka (JP)

(73) Assignee: Panasonic Corporation, Osaka (JP)

( * ) Notice: Subject to any disclaimer, the term of this patent is extended or adjusted under 35 U.S.C. 154(b) by 18 days.

(21) Appl. No.: 12/194,061

(22) Filed: Aug. 19, 2008

(65) Prior Publication Data
US 2009/0063742 A1   Mar. 5, 2009

(30) Foreign Application Priority Data
Aug. 29, 2007   (JP) .............................. 2007-222684

(51) Int. Cl.
*G06F 13/00* (2006.01)
(52) U.S. Cl. ...................................... 710/301; 710/316
(58) Field of Classification Search ......... 710/300–306, 710/316–317, 107–110
See application file for complete search history.

(56) References Cited

U.S. PATENT DOCUMENTS

| | | | |
|---|---|---|---|
| 6,708,230 B2 * | 3/2004 | Shin | 710/9 |
| 6,820,148 B1 * | 11/2004 | Cedar et al. | 710/104 |
| 6,993,601 B2 * | 1/2006 | Minami et al. | 710/38 |
| 7,069,369 B2 * | 6/2006 | Chou et al. | 710/301 |
| 7,237,052 B2 * | 6/2007 | Okamoto et al. | 710/301 |
| 7,360,003 B2 * | 4/2008 | Toombs et al. | 710/301 |
| 7,587,544 B2 * | 9/2009 | Tang et al. | 710/260 |
| 2006/0010266 A1 | 1/2006 | Liu et al. | |
| 2006/0095627 A1 * | 5/2006 | Pinto et al. | 710/301 |
| 2006/0209196 A1 | 9/2006 | Ohtsuka et al. | |
| 2007/0198770 A1 | 8/2007 | Horii et al. | |

FOREIGN PATENT DOCUMENTS

JP   2006-024217   1/2006

* cited by examiner

*Primary Examiner*—Raymond N Phan
(74) *Attorney, Agent, or Firm*—McDermott Will & Emery LLP (57) ABSTRACT

A host controller can divide a preliminary process for writing to a memory card, or the like, into a plurality of unit processes for execution. While writing or the like is being performed with respect to a memory card (card 1), a new-card preliminary division process of performing one unit process of the preliminary process with respect to a new memory card (card 2) is repeatedly executed. Thereby, the interrupt time of writing or the like due to the preliminary process of the card 2 is divided and distributed, so that each interrupt time division of writing or the like can be reduced.

7 Claims, 8 Drawing Sheets

HOST APPARATUS FOR CONTROLLING MEMORY CARDS WHICH MINIMIZES INTERRUPTION OF WRITING TO MEMORY CARDS

CROSS REFERENCE TO RELATED APPLICATIONS

This Non-provisional application claims priority under 35 U.S.C. §119(a) on Patent Application No. 2007-222684 filed in Japan on Aug. 29, 2007, the entire contents of which are hereby incorporated by reference.

BACKGROUND OF THE INVENTION

1. Field of the Invention

The present invention relates to a technique of controlling a plurality of memory cards using a single host controller in a host apparatus having a plurality of card slots.

2. Description of the Related Art

In recent years, as the capacities of memory cards (hereinafter simply referred to as "cards" as appropriate) have been increased, apparatuses that continuously transmit or receive a large amount of data to or from a memory card have been appeared, including a digital camcorder capable of directly writing high-image-quality recorded data into a memory card, and the like. In such apparatuses, for example, when a memory card is full of recorded data, data can no longer be saved or recording can no longer be performed unless the memory card is manually replaced with another memory card. For apparatuses, such as particularly a surveillance camera and the like, in which the continuity of recording is required and no interruption is accepted, it is essentially necessary to write and save recorded data into memory cards without interruption. This can be simply achieved by providing a buffer memory having a large capacity for temporarily storing recorded data, which is significantly disadvantageous in terms of cost.

To solve this problem, a plurality of card slots may be provided in an apparatus. Thereby, while a write operation is being performed with respect to a memory card in one of the slots, card replacement can be performed in another slot. In other words, if a memory card is inserted in at least one of the slots, a destination to which recorded data is written can be secured all the time.

However, a host controller can typically handle and control only one slot, e.g., can issue a command only to one memory card. Therefore, when a plurality of card slots is provided in an apparatus, the same number of host controllers as the number of slots need to be provided, where one host controller is dedicated to control one slot. However, when a plurality of host controllers are provided, the area of a chip is increased in addition to an increase of the cost of the host controllers themselves, which is significantly disadvantageous in terms of cost.

To solve this problem, Japanese Unexamined Patent Application Publication No. 2006-24217 discloses a host apparatus that comprises means for handling a plurality of card slots using a single host controller. Specifically, a selector for switching slots to which the host controller is to be connected is provided. The selector is operated with appropriate timing to switch the slots, so that a plurality of memory cards inserted in the slots can be simultaneously used without replacement. Thereby, a plurality of slots can be controlled without providing a plurality of host controllers, so that, even if a memory card is full, data can be continuously written into another memory card that is previously inserted in another slot.

However, the above-described conventional technique has the following problems.

In general, a memory card cannot be used immediately after being inserted into a slot. The memory card needs to be initialized, i.e., a plurality of commands for initialization need to be issued to the memory card in accordance with a predetermined sequence. Further, a process of reading a file allocation table (FAT) and the like need to be performed. Only after these processes are performed, data can be written into the memory card. Therefore, writing is interrupted during card initialization and FAT reading, which are performed after a memory card becomes full and before another memory card gets ready for writing.

Even if a memory card to be next used is initialized before a currently used memory card becomes full, but not immediately before writing, writing is interrupted. This is because a plurality of memory cards cannot be simultaneously accessed in the above-described conventional technique, and therefore, writing to a memory card and initialization of another memory card cannot be simultaneously performed. Similarly, reading needs to be interrupted.

In other words, in the above-described conventional technique, interruption of writing can be avoided during replacement of a memory card, but interruption of writing cannot be avoided until a new memory card gets ready for writing. Note that, in the case of an SD (Secure Digital) card, it takes about one second to initialize the card. Taking a FAT reading process into consideration as well, it takes at least about three seconds for the card to get ready for writing. Therefore, a large-capacity buffer memory capable of saving 3-second data needs to be provided.

SUMMARY OF THE INVENTION

An object of the present invention is to provide a host apparatus for controlling a plurality of card slots using a single host controller, in which the size of a buffer memory for saving data that is used during interruption of writing or reading when memory cards are switched, is reduced as compared to the conventional art.

The present invention provides a host apparatus comprising a host controller, a plurality of card slots into each of which a memory card can be inserted, and a slot switching section provided between the host controller and the plurality of card slots and for switching a connection destination of a signal line from the host controller, between the plurality of card slots, in accordance with an instruction from the host controller, thereby switching card slots to be a control target. The host controller can divide a preliminary process for writing to or reading out from a memory card inserted in the card slot, into a plurality of unit processes for execution. The host controller, when a new memory card is inserted into a second card slot while writing or reading is being performed with respect to a memory card inserted in a first card slot, repeatedly performs a new-card preliminary division process including the steps of (a) switching the control target from the first card slot to the second card slot using the slot switching section, (b) executing a unit process of the preliminary process with respect to the new memory card, and (c) switching the control target from the second card slot to the first card slot using the slot switching section.

According to the present invention, the host controller can divide a preliminary process for wiring or reading with respect to a memory card, into a plurality of unit processes for execution. While writing or reading is being performed with respect to a memory card, a new-card preliminary division process of executing one unit process of the preliminary process with respect to a new memory card is repeatedly executed. Therefore, writing or reading with respect to the memory card and one unit process of the preliminary process with respect to the new memory card are alternately executed. Thereby, the write or read interrupt time due to the preliminary process with respect to the new memory card can be divided and distributed, so that each write or read interrupt time division can be reduced. Therefore, the size of a buffer memory for saving data that is used during interruption of writing or reading when memory cards are switched, can be significantly reduced as compared to the conventional art.

Also, in the host apparatus of the present invention, the slot switching section may include a control selector for switching a connection destination of a control signal line from the host controller, between the plurality of card slots, and a data transfer selector for switching a connection destination of a data transfer signal line from the host controller, between the plurality of card slots. The control selector and the data transfer selector can perform a switching operation independently of each other. In the new-card preliminary division process executed by the host controller, it may be assumed that the unit process in step (b) does not involve data transfer. In this case, in step (a), while the connection destination of the data transfer signal line may be maintained as the first card slot by the data transfer selector, the connection destination of the control signal line may be switched from the first card slot to the second card slot by the control selector. In step (c), the connection destination of the control signal line may be switched from the second card slot to the first card slot by the control selector.

According to the present invention, in the slot switching section, the control selector for switching the connection destinations of the control signal line, and the data transfer selector for switching the connection destinations of the data transfer signal line, can perform the switching operations independently of each other. In the new-card preliminary division process, when a unit process executed does not involve data transfer, the connection destinations of the data transfer signal line are not switched and only the connection destinations of the control signal line are switched. Thereby, while a unit process that does not involve data transfer is being executed, writing or reading with respect to a memory card can be continued, so that the write or read interrupt time can be reduced. Therefore, the access efficiency can be significantly improved.

According to the present invention, the write or read interrupt time due to the preliminary process with respect to a new memory card is divided and distributed, so that each write or read interrupt time division can be reduced. Therefore, the size of a buffer memory for saving data that is used during interruption of writing or reading when memory cards are switched can be significantly reduced as compared to the conventional art.

According to the present invention, while a unit process that does not involve data transfer is being executed, writing or reading with respect to a memory card can be continued, so that the write or read interrupt time can be reduced. Therefore, the access efficiency can be significantly improved.

DETAILED DESCRIPTION OF THE PREFERRED EMBODIMENTS

Hereinafter, a best mode for carrying out the present invention will be described with reference to the accompanying drawings.

Embodiment 1

Figure 1:
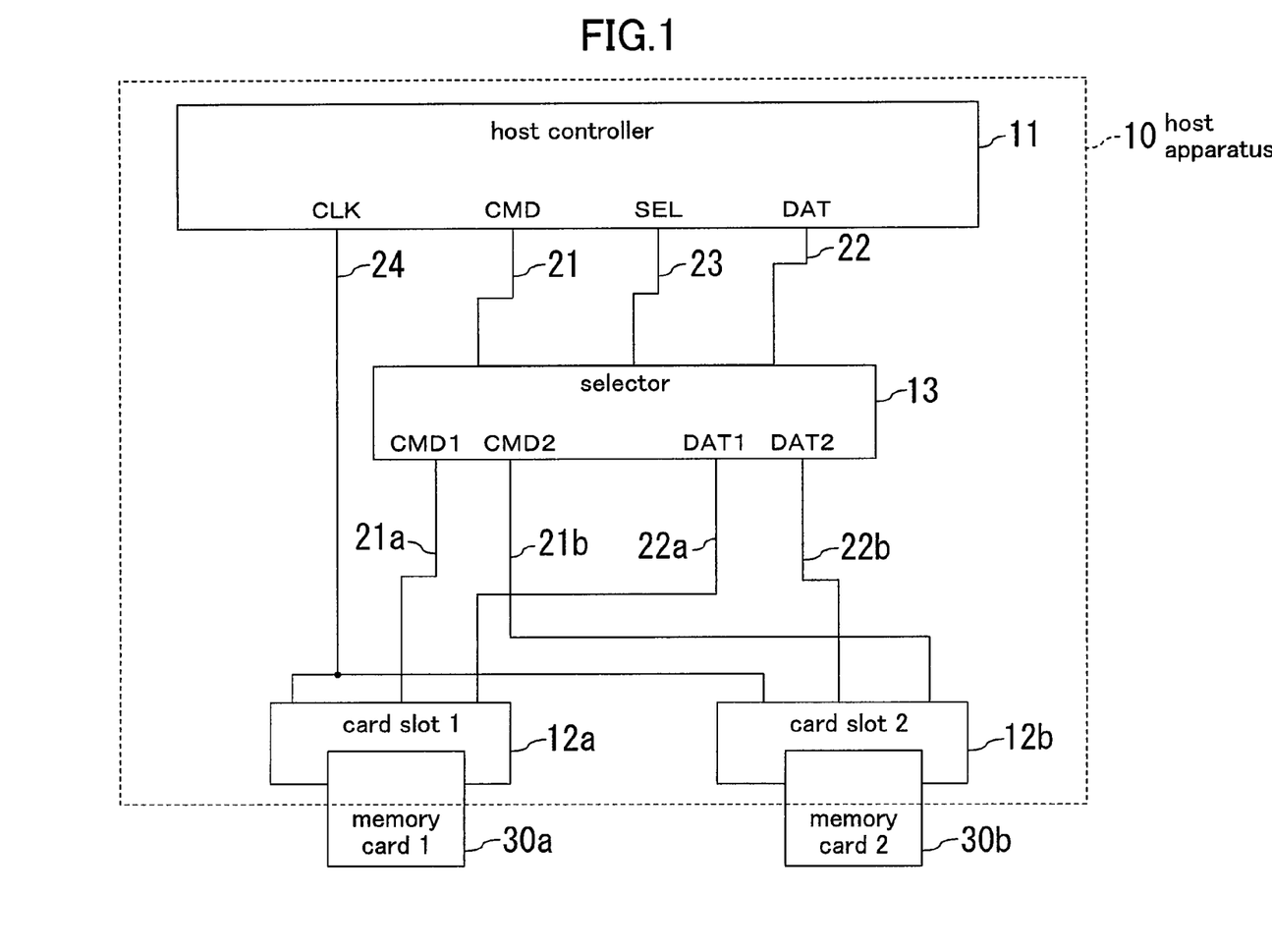
FIG. 1 is a diagram showing a configuration of a host apparatus according to Embodiment 1 of the present invention.

FIG. 1 is a block diagram showing a configuration of a host apparatus according to Embodiment 1 of the present invention. In FIG. 1, the host apparatus 10 comprises a host controller 11, two card slots 12a and 12b into which a memory card can be inserted, and a selector 13 provided between the host controller 11 and the card slots 12a and 12b. The selector 13, which serves as a slot switching section, switches a destination to which a signal line from the host controller 11 is to be connected, between the card slots 12a and 12b, in accordance with an instruction from the host controller 11, i.e., switches card slots to be controlled by the host controller 11. An example of the host apparatus 10 is a digital camcorder. The host apparatus 10 writes data that has been captured and recorded, via a buffer memory to memory cards 30a and 30b. The memory cards 30a and 30b are here assumed to be an SD card.

The host controller 11 and the selector 13 are connected to each other via a CMD line 21 that is a signal line for controlling a card, a DAT line 22 that is a signal line for transferring data, and a SEL line 23 that is a signal line for controlling the selector 13. The selector 13 and the card slot 12a are connected to each other via a CMD line 21a and a DAT line 22a. The selector 13 and the card slot 12b are connected to each other via a CMD line 21b and a DAT line 22b. A CLK line 24 that is a clock signal line directly connects the host controller 11 and the card slots 12a and 12b.

The host controller 11 can control a signal on the SEL line 23 so as to switch the connection destination of the CMD line 21 to any one of the CMD line 21a and the CMD line 21b. In this case, the selector 13 also switches the connection destination of the DAT line 22, between the DAT line 22a and the DAT line 22b, so that the CMD line 21 and the DAT line 22 are invariably connected to the same card slot.

When the memory card 30a is inserted into the card slot 12a, the CMD line 21a, the DAT line 22a and the CLK line 24 are all connected to corresponding pins of the memory card 30a. Similarly, when the memory card 30b is inserted into the card slot 12*b*, the CMD line 21*b*, the DAT line 22*b* and the CLK line 24 are all connected to corresponding pins of the memory card 30*b*.

Note that it is assumed that the presence or absence of a memory card can be independently detected in each card slot all the time irrespective of the state of the SEL line 23. For example, the host controller 11 is configured so that an interrupt occurs when a memory card is inserted into a card slot. Alternatively, the host controller 11 detects insertion of a memory card into a card slot by polling.

An operation of the thus-configured host apparatus 10 will be described with reference to a flowchart shown in FIG. 2. It is here assumed that when recorded data is being written into the memory card 30*a* (card 1) inserted in the card slot 12*a* as a first card slot, the memory card 30*b* (card 2) is newly inserted into the card slot 12*b* as a second card slot. An operation of the host controller 11 after the card 1 becomes full and until writing to the card 2 is started, in this situation, will be described.

Note that the host controller 11 is assumed to be able to divide a preliminary process for writing to a memory card inserted in a card slot into a plurality of unit processes for execution. It is here assumed that the preliminary process is a process of initializing a memory card and the unit processes each correspond to one command. In FIG. 2, steps S103, S104 and S105 correspond to a new-card preliminary division process.

(S101) A write command is issued to the card 1, and recorded data is written into the card 1. Note that, in this case, all recorded data saved in the buffer memory is written into the card 1.

(S102) It is checked whether or not the card 2 has been inserted. If the card 2 has been inserted, it is checked whether or not the card 2 has been initialized. If the card 2 has not been inserted or the card 2 has been initialized, step S106 is performed.

(S103) If the card 2 has not been initialized in step S102, the connection destination of the signal lines is switched to the card slot 12*b* by controlling the selector 13 by changing a signal on the SEL line 23. In other words, the host controller 11 switches a control target from the card slot 12*a* to the card slot 12*b* by the selector 13.

(S104) A single appropriate initialization command is issued to the card 2 with reference to the initialized state of the card 2, such as an immediately previously issued initialization command or the like. Note that, during this time, writing to the card 1 is interrupted.

(S105) The connection destination of the signal lines is switched to the card slot 12*a* by operating the selector 13 by changing a signal on the SEL line 23. In other words, the host controller 11 switches a control target from the card slot 12*b* to the card slot 12*a* by the selector 13.

(S106) It is checked whether or not the card 1 is full. If free space still exists in the card 1, the process returns to step S101 and writing is continued.

(S107) When it is determined in step S106 that the card 1 is full, the connection destination of the signal lines is switched to the card slot 12*b* by operating the selector 13 by changing a signal on the SEL line 23.

(S108) It is checked whether or not the card 2 has been initialized. Note that if the card 2 has not been inserted, the process is stopped.

(S109) If it is determined in step S108 that the card 2 has not been initialized, the initialization process of the card 2 is completed.

(S110) After execution of step S109, or when it is determined in step S108 that the card 2 has been initialized, a write command is issued to the card 2, and recorded data is written into the card 2. Note that a FAT reading process and the like are actually required before writing.

Note that, in the case of an SD card, ACMD41, which is an initialization command, is normally repeatedly issued with the signal lines being connected while BUSY cancellation from the card is waited for. By contrast, in this embodiment, after ACMD41 is issued (S104), connection is switched to the card slot 12*a* (S105), connection is switched back to the card slot 12*b* (S103), and ACMD41 is issued (S104).

Figure 2:
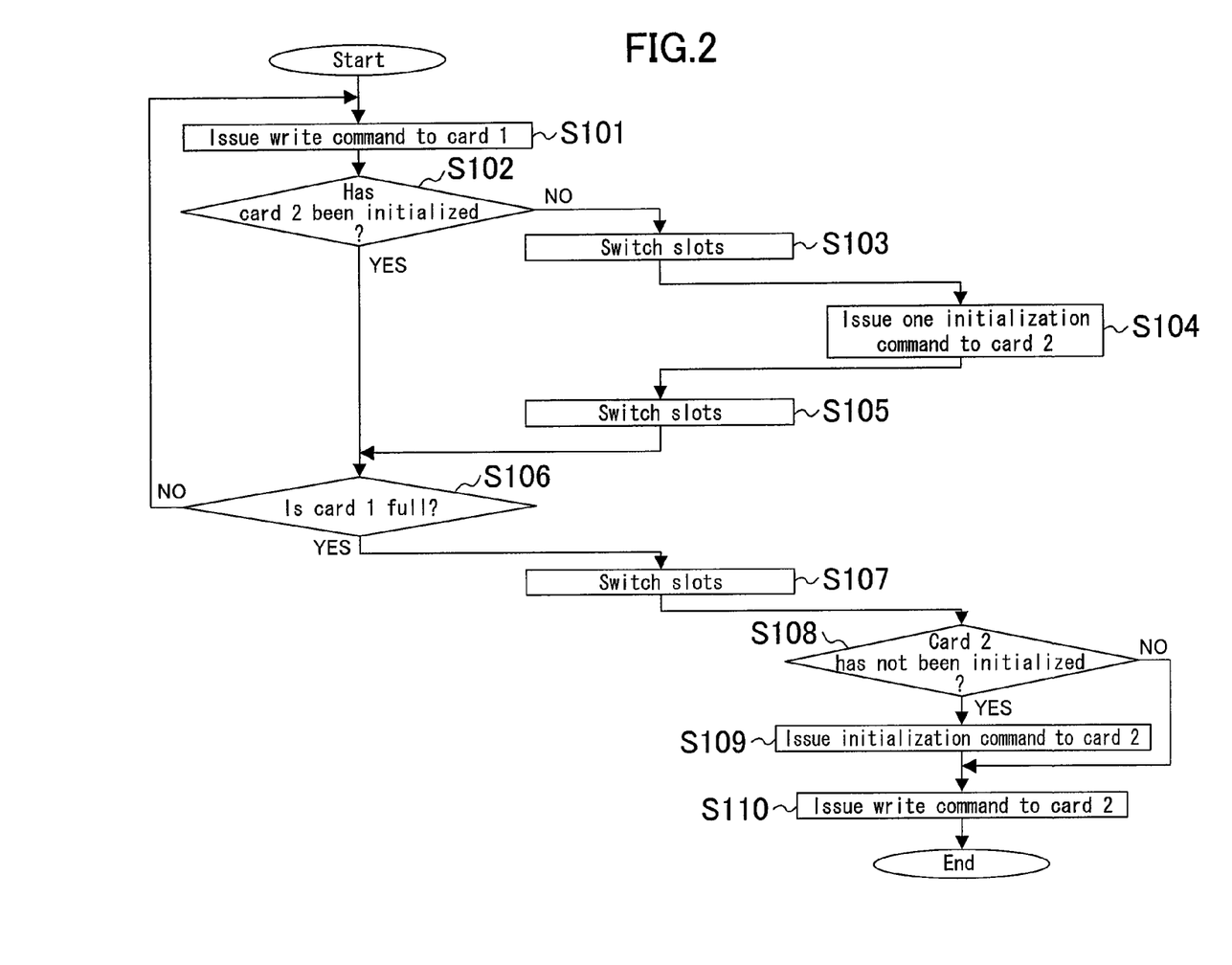
FIG. 2 is a flowchart showing processes of a host controller before and after switching of cards in Embodiment 1 of the present invention.
Figure 3:
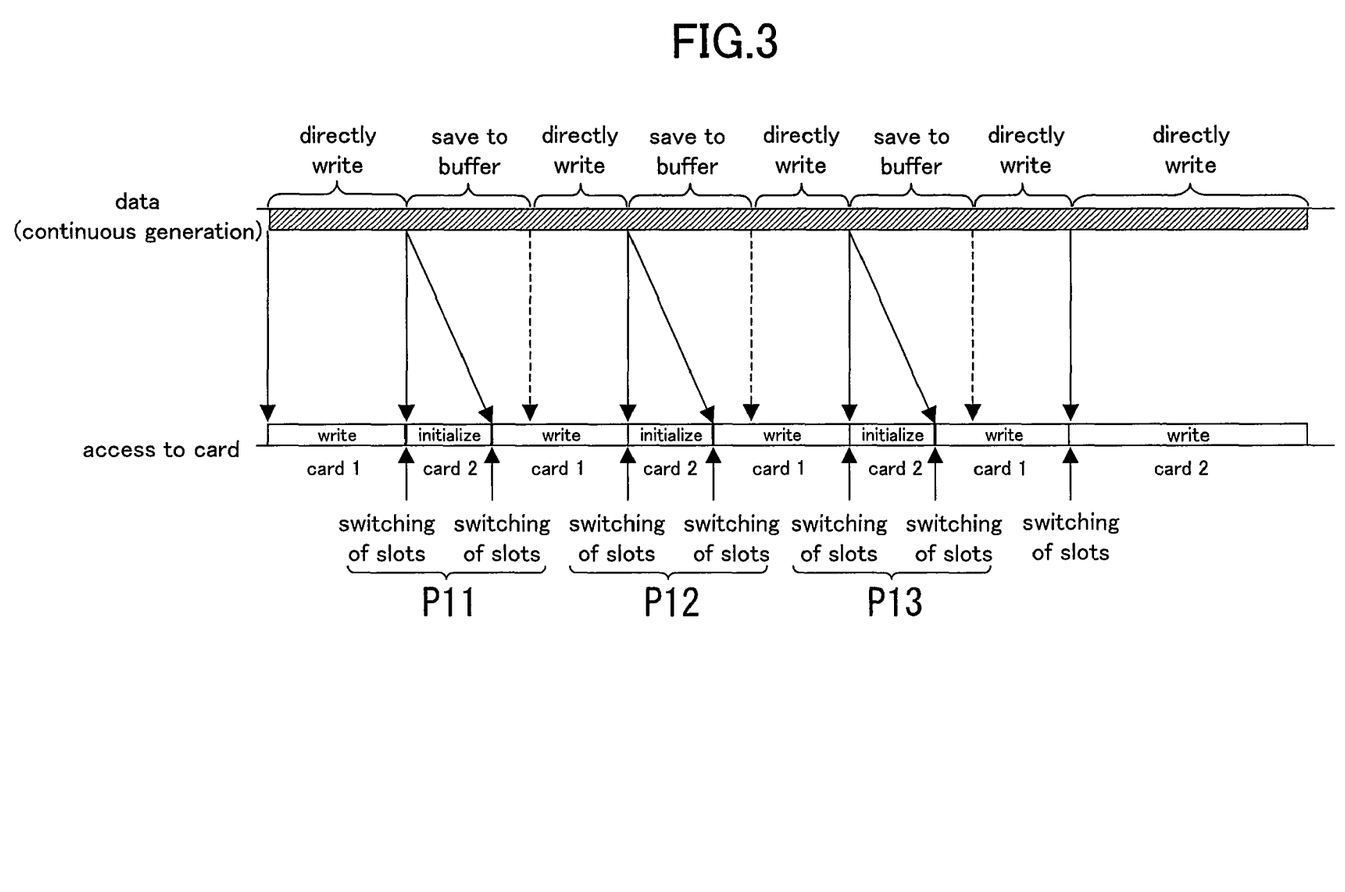
FIG. 3 is a timing chart showing the concept of operations before and after switching of cards in Embodiment 1 of the present invention.

FIG. 3 is a timing chart showing the concept of the above-described operation of this embodiment. As shown in FIG. 3, the new-card preliminary division process including steps S103, S104 and S105 of FIG. 2 is repeatedly executed (P11, P12, P13) with respect to the card 2 partway through writing to the card 1. Thereby, the write interrupt time involved with card initialization is divided and distributed, so that each write interrupt time division can be reduced.

It will be here discussed how much the buffer memory can be reduced by the technique of this embodiment under assumptions described below. Note that a memory card is assumed to be an SD card.

<Assumptions>
(1) The rate of writing to the card is 2 MB/sec.
(2) The rate of recorded data is 1.5 MB/sec.
(3) The maximum time required for the whole card initialization is 2 sec.
(4) The maximum data transfer size during card initialization is 512 Bytes.
(5) The maximum time required for reading of a FAT is 3 sec.
(6) The clock to the card is 25 MHz.
(7) The bus width of data transfer with respect to the card is 4 bits.
(8) Only one card is ready for writing of data before start of recording, i.e., FAT reading and the like have been completed for the card.
(9) A sufficient time before a card to which writing is being performed becomes full, another card is inserted into another card slot.

Figure 8:
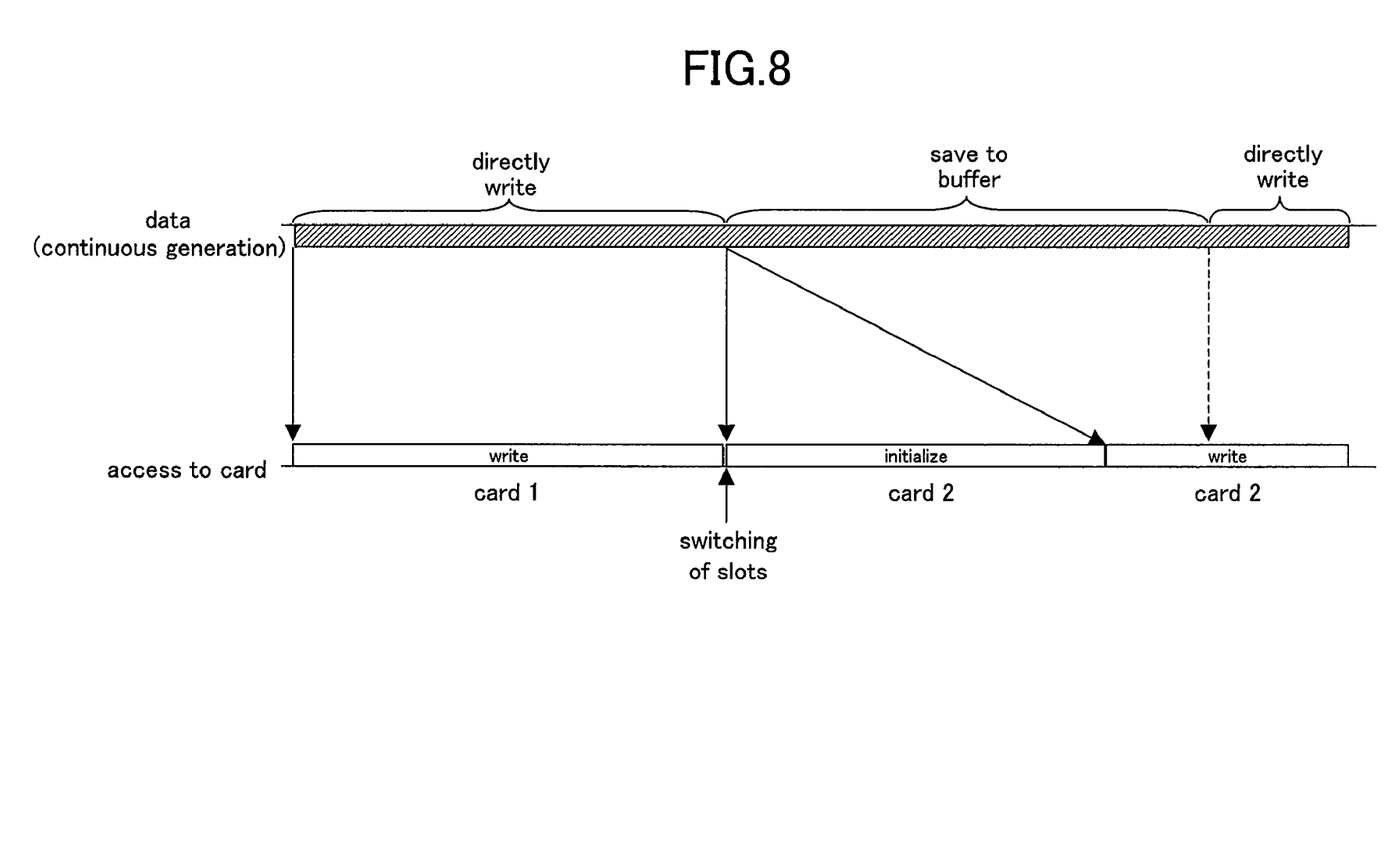
FIG. 8 is a timing chart showing conventional operations before and after switching of cards.

Firstly, the size of a buffer memory required for a conventional case is calculated. As shown in FIG. 8, when cards are switched (i.e., after the card 1 becomes full and until writing to the card 2 is started), a card initialization process is required. Thereafter, a FAT reading process is normally performed. According to assumptions (3) and (5), the maximum time required for these processes is 5 sec by:

$$2 \text{ sec} + 3 \text{ sec} = 5 \text{ sec} \qquad (1).$$

According to assumption (2), the rate of recorded data is 1.5 MB/sec. Therefore, data produced in 5 sec is 7.5 MB by:

$$1.5 \text{ MB/sec} \times 5 \text{ sec} = 7.5 \text{ MB} \qquad (2).$$

Typically, the size of a buffer memory needs to be enough even when the maximum time is consumed. Therefore, the size of a buffer memory required by a conventional host apparatus is 7.5 MB.

Next, the size of a buffer memory required for this embodiment is calculated. In this embodiment, as shown in FIG. 3, the initialization process of the card 2 is performed on a command-by-command basis in parallel with writing to the card 1. Therefore, a write interrupt also occurs and the buffer memory also needs to be used other than when cards are switched after a card becomes full. A write interrupt time corresponding to one card initialization command occurs. According to assumptions (4), (6) and (7), the maximum interrupt time is 0.00004 sec by:

$$512 \text{ Bytes} \times 8 \div 4 \text{ bits} \div 25 \text{ MHz} = 0.00004 \text{ sec} \qquad (3).$$

According to assumption (2), the rate of recorded data is 1.5 MB/sec. Therefore, the amount of data generated in 0.00004 sec is 0.00006 MB by:

$$1.5 \text{ MB/sec} \times 0.00004 \text{ sec} = 0.00006 \text{ MB} \quad (4).$$

Also, only a FAT reading process is required when cards are switched, i.e., after the card 1 becomes full and until writing to the card 2 is started. According to assumption (5), the maximum time required for this process is 3 sec. According to assumption (2), the rate of recorded data is 1.5 MB/sec. Therefore, the amount of data generated in 3 sec is 4.5 MB by:

$$1.5 \text{ MB/sec} \times 3 \text{ sec} = 4.5 \text{ MB} \quad (5).$$

The buffer memory needs to have a size corresponding to the larger one of the above-described amounts. Therefore, according to expressions (4) and (5), the required size of the buffer memory is 4.5 MB.

As described above, by using the technique of this embodiment, the required size of the buffer memory is reduced from 7.5 MB to 4.5 MB. Thus, a decrease in buffer memory size is 3 MB by:

$$7.5 \text{ MB} - 4.5 \text{ MB} = 3 \text{ MB} \quad (6).$$

As described above, according to this embodiment, the host controller 11 can divide the initialization process of writing to a memory card into unit processes each corresponding to a command, for execution. While writing to a memory card is being performed, a new-card preliminary division process of performing an initialization process corresponding to one command is repeatedly executed with respect to a new memory card. Therefore, writing to a memory card and a one-command initialization process of a new memory card are alternately executed. Thereby, the write interrupt time involved with initialization of a new memory card is divided and distributed, so that each write interrupt time division can be reduced. Therefore, the size of a buffer memory for saving data that is used during interruption of writing when memory cards are switched can be significantly reduced as compared to the conventional art.

Embodiment 2

Figure 4:
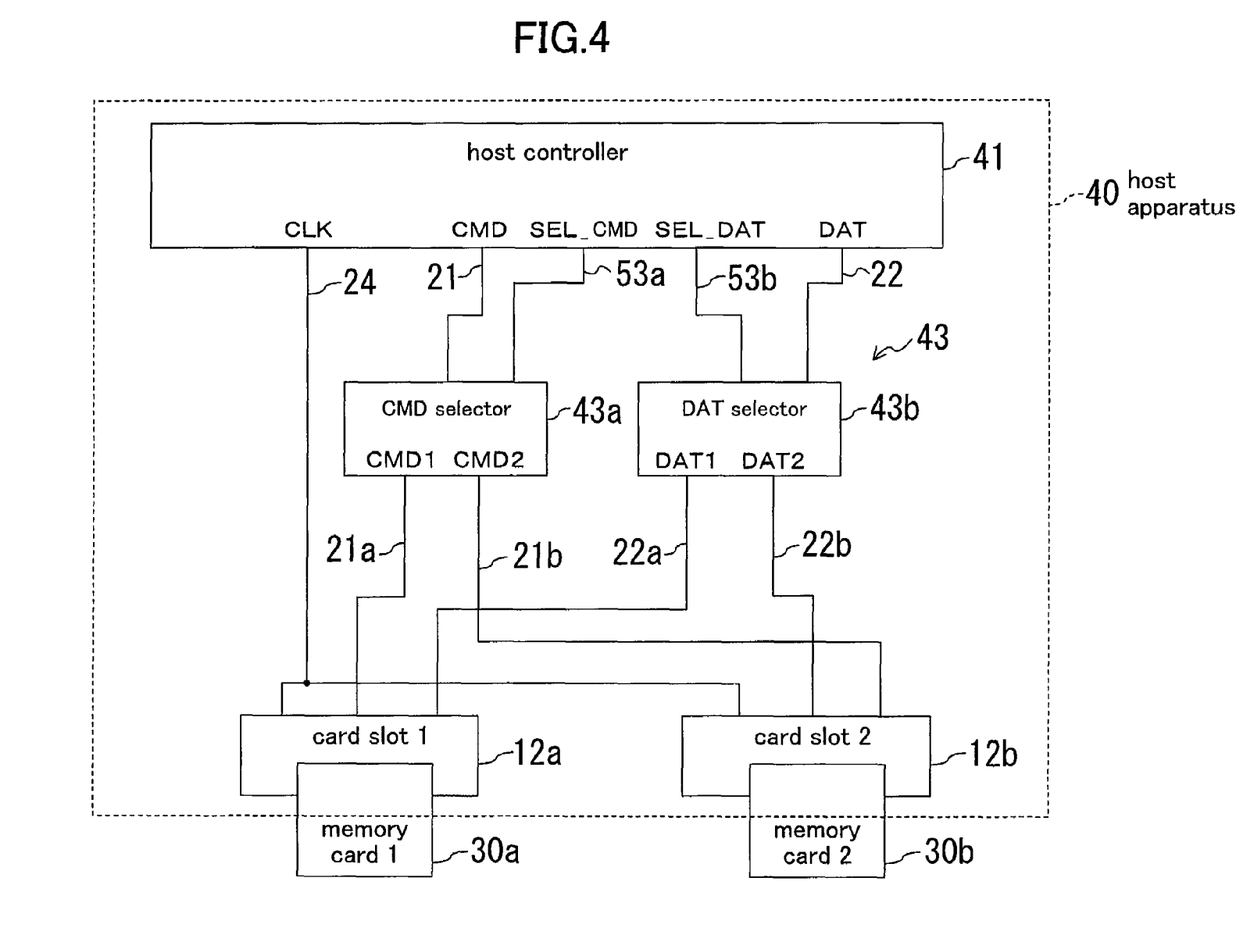
FIG. 4 is a diagram showing a configuration of a host apparatus according to Embodiment 2 of the present invention.

FIG. 4 is a block diagram showing a configuration of a host apparatus according to Embodiment 2 of the present invention. In FIG. 4, the same parts as those of FIG. 1 are indicated by the same reference numerals. In FIG. 4, the host apparatus 40 comprises a host controller 41, two card slots 12a and 12b into which a memory card can be inserted, and a CMD selector 43a and a DAT selector 43b provided between the host controller 41 and the card slots 12a and 12b. The CMD selector 43a, which serves as a control selector, switches the connection destination of a control signal line (i.e., a CMD line 21) from the host controller 41, between the card slots 12a and 12b. The DAT selector 43b, which serves as a data transfer selector, switches the connection destination of a data transfer signal line (i.e., a DAT line 22) from the host controller 41, between the card slots 12a and 12b. The CMD selector 43a and the DAT selector 43b constitute a slot switching section 43 that has a function of switching card slots that are control targets of the host controller 41. The slot switching section 43 switches the connection destination of the signal lines from the host controller 41, between the card slots 12a and 12b, in accordance with an instruction from the host controller 41. An example of the host apparatus 40 is a digital camcorder. As in Embodiment 1, the host apparatus 40 writes data that has been captured and recorded, via a buffer memory to memory cards 30a and 30b. The memory cards 30a and 30b are here assumed to be an SD card.

The host controller 41 and the CMD selector 43a are connected to each other via a CMD line 21 and a SEL line 53a that is a signal line for controlling the selector 43a. The CMD selector 43a and the card slot 12a are connected to each other via a CMD line 21a, and the CMD selector 43a and the card slot 12b are connected to each other via a CMD line 21b. Similarly, the host controller 41 and the DAT selector 43b are connected to each other via a DAT line 22 and a SEL line 53b that is a signal line for controlling the selector 43b. The DAT selector 43b and the card slot 12a are connected to each other via a DAT line 22a, and the DAT selector 43b and the card slot 12b are connected to each other via a DAT line 22b. A CLK line 24 directly connects the host controller 41 and the card slots 12a and 12b.

The host controller 41 can switch the connection destination of the CMD line 21 to any one of the CMD line 21a and the CMD line 21b by operating a signal on the SEL line 53a. The host controller 41 can also switch the connection destination of the DAT line 22 to any one of the DAT line 22a and the DAT line 22b by operating a signal on the SEL line 53b. Note that the operation of a signal on the SEL line 53a and the operation of a signal on the SEL line 53b can be performed with separate timing.

When the memory card 30a is inserted into the card slot 12a, the CMD line 21a, the DAT line 22a and the CLK line 24 are all connected to corresponding pins of the memory card 30a. Similarly, when the memory card 30b is inserted into the card slot 12b, the CMD line 21b, the DAT line 22b and the CLK line 24 are all connected to corresponding pins of the memory card 30b.

Note that, as in Embodiment 1, it is assumed that the presence or absence of a memory card can be independently detected in each card slot all the time irrespective of the state of the SEL line.

An operation of the thus-configured host apparatus 40 will be described with reference to a flowchart shown in FIG. 5. It is here assumed that when recorded data is being written into the memory card 30a (card 1) inserted in the card slot 12a as a first card slot, the memory card 30b (card 2) is newly inserted into the card slot 12b as a second card slot. An operation of the host controller 41 after the card 1 becomes full and until writing to the card 2 is started, in this situation, will be described.

Note that, as in Embodiment 1, the host controller 41 is assumed to be able to divide a preliminary process for writing to a memory card inserted in a card slot into a plurality of unit processes for execution. It is here assumed that the preliminary process is a process of initializing a memory card and the unit processes each correspond to one command. In FIG. 5, steps S203, S204 and S205 correspond to a new-card preliminary division process.

Figure 5:
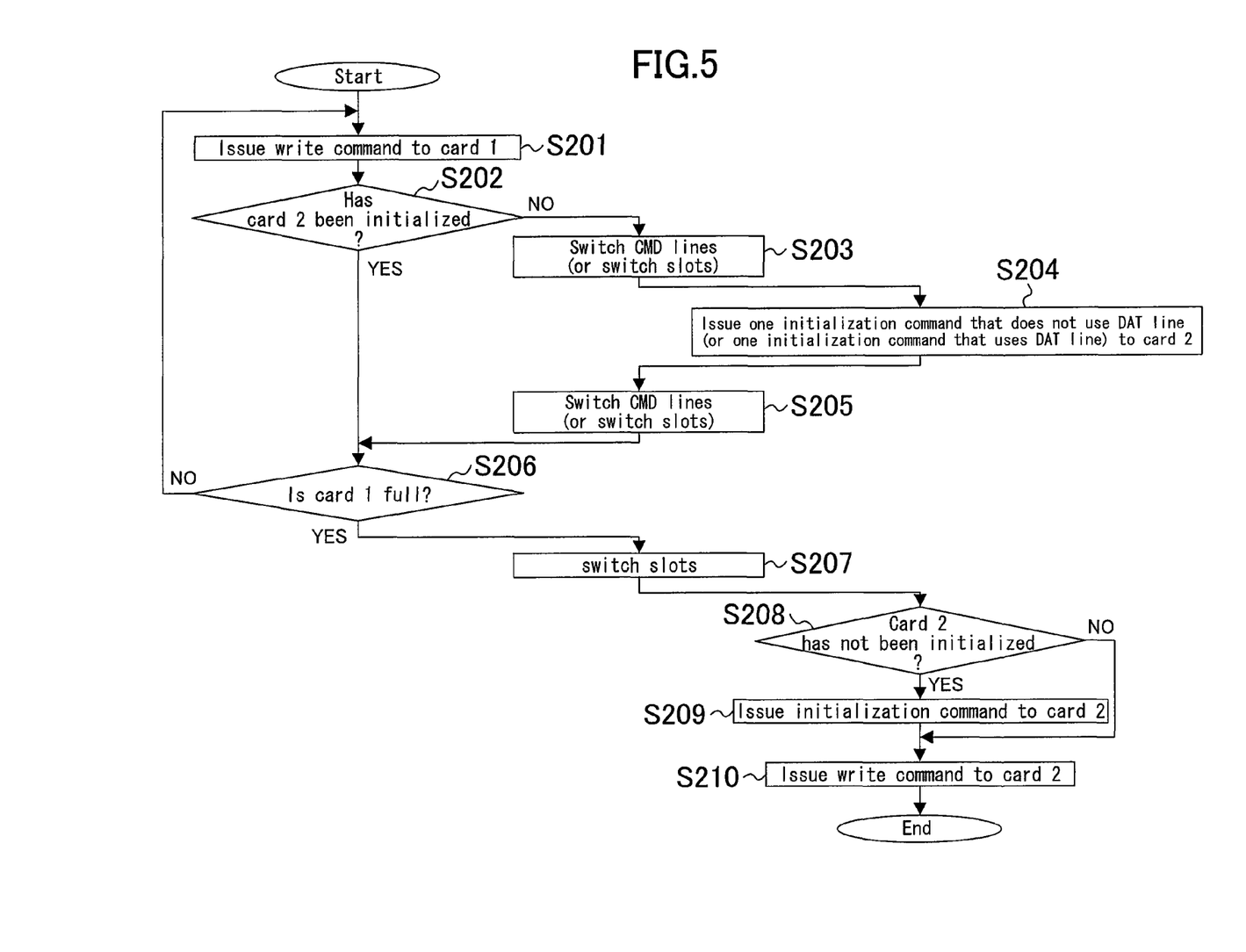
FIG. 5 is a flowchart showing processes of a host controller before and after switching of cards in Embodiment 2 of the present invention.

The operation of FIG. 5 is basically similar to the operation of FIG. 2, except that, in the new-card preliminary division process executed, when a unit process does not involve data transfer (here, an issued command does not use the DAT line) in step S204, only the connection destination of the CMD line 21 is switched from the card slot 12a to the card slot 12b without switching the connection destination of the DAT line 22 in step S203.

(S201) A write command is issued to the card 1, and recorded data is written into the card 1. Note that, in this case, all recorded data saved in the buffer memory is written into the card 1.

(S202) It is checked whether or not the card 2 has been inserted. If the card 2 has been inserted, it is checked whether or not the card 2 has been initialized. If the card 2 has not been inserted or the card 2 has been initialized, step S206 is performed.

(S203) If it is determined in step S202 that the card 2 has not been initialized, the connection destination of the CMD line 21 is switched to the card slot 12*b* by operating the CMD selector 43*a* by changing a signal on the SEL line 53*a*. In this case, if an initialization command issued in step S204 is a command that does not use a DAT line, the connection destination of the DAT line 22 is maintained as the card slot 12*a*. On the other hand, when the initialization command issued in step S204 is a command that uses a DAT line, the connection destination of the DAT line 22 is also switched to the card slot 12*b* by operating the DAT selector 43*b* by changes a signal on the SEL line 53*b*.

(S204) An appropriate initialization command is issued to the card 2 with reference to the initialized state of the card 2, such as an immediately previously issued initialization command or the like. Note that if the issued initialization command is a command that does not use a DAT line, writing to the card 1 is continued without interruption during this time. On the other hand, if the issued initialization command is a command that uses a DAT line, writing to the card 1 is interrupted during this time.

(S205) The connection destination of the CMD line 21 is switched to the card slot 12*a* by operating the CMD selector 43*a* by changing a signal on the SEL line 53*a*. Note that, in step S203, if the connection destination of the DAT line 22 has also been switched to the card slot 12*b*, the connection destination of the DAT line 22 is also switched to the card slot 12*a* by operating the DAT selector 43*b* by changing a signal on the SEL line 53*b*.

(S206) It is checked whether or not the card 1 is full. If free space still exists in the card 1, the process returns to step S201 and writing is continued.

(S207) When it is determined in step S206 that the card 1 is full, the connection destination of the signal lines is switched to the card slot 12*b* by operating the SEL lines 53*a* and 53*b*.

(S208) It is checked whether or not the card 2 has been initialized. Note that if the card 2 has not been inserted, the process is stopped.

(S209) If it is determined in step S208 that the card 2 has not been initialized, the initialization process of the card 2 is completed.

(S210) After execution of step S209, or when it is determined in step S208 that the card 2 has been initialized, a write command is issued to the card 2, and recorded data is written into the card 2. Note that a FAT reading process and the like are actually required before writing of a card.

Figure 6:
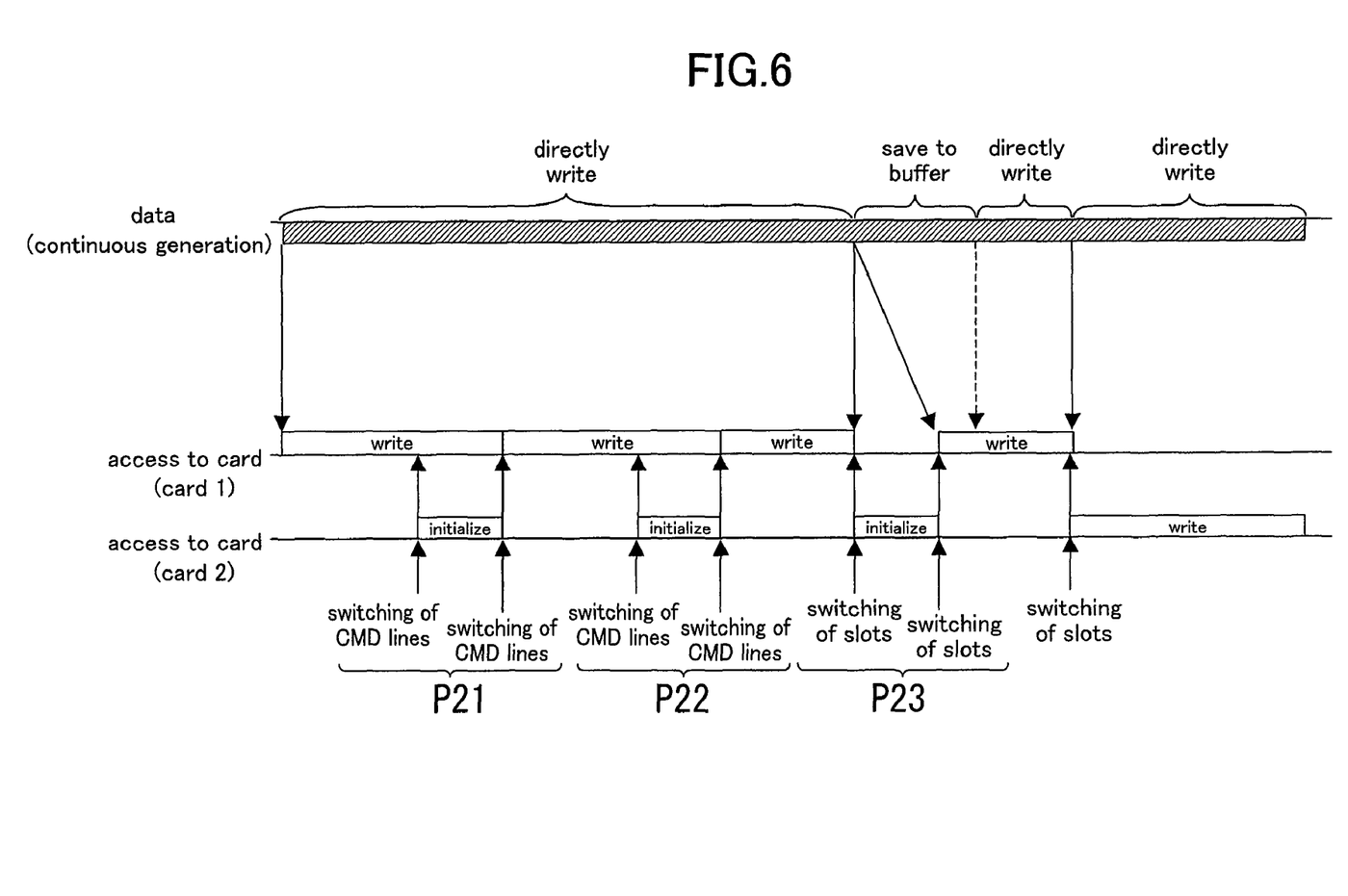
FIG. 6 is a timing chart showing the concept of operations before and after switching of cards in Embodiment 2 of the present invention.

FIG. 6 is a timing chart showing the concept of the above-described operation of this embodiment. As shown in FIG. 6, the new-card preliminary division process including steps S203, S204 and S205 of FIG. 5 is repeatedly executed (P21, P22, P23) with respect to the card 2 partway through writing to the card 1. In the new-card preliminary division processes P21 and P22, the unit process in step S204 does not involve data transfer, so that the switching of the DAT lines has not been performed. Therefore, during this period of time, writing to the card 1 is continued without interruption. In other words, according to this embodiment, a new-card preliminary division process that performs a unit process that does not involve data transfer can be executed at the same time when data transfer is performed in writing to the card 1, so that a write interrupt time can be reduced.

Here, it will be discussed how much a buffer memory can be reduced by the technique of Embodiment 2 under the assumptions described in Embodiment 1. In this embodiment, as shown in FIG. 6, as in Embodiment 1, the initialization process of the card 2 is performed on a command-by-command basis in parallel with writing to the card 1. Therefore, a possible decrease in the size of the buffer memory is the same as that in Embodiment 1. Specifically, by using the technique of this embodiment, the required size of the buffer memory can be reduced by 3 MB. This embodiment is different from Embodiment 1 in that, of the commands for initialization, a command that does not use a DAT line can be executed at the same time when writing is performed, so that the access efficiency is improved.

As described above, according to the present invention, in the slot switching section 43, the CMD selector 43*a* for switching the connection destination of the CMD line and the DAT selector 43*b* for switching the connection destination of the DAT line can be operated independently of each other. When a unit process executed in the new-card preliminary division process does not involve data transfer, the connection destination of the DAT line is not switched and only the connection destination of the CMD line is switched. Thereby, writing to a memory card can be continued when a command that does not involve data transfer is executed, so that a write interrupt time can be reduced. Therefore, the access efficiency can be significantly improved.

Figure 7:
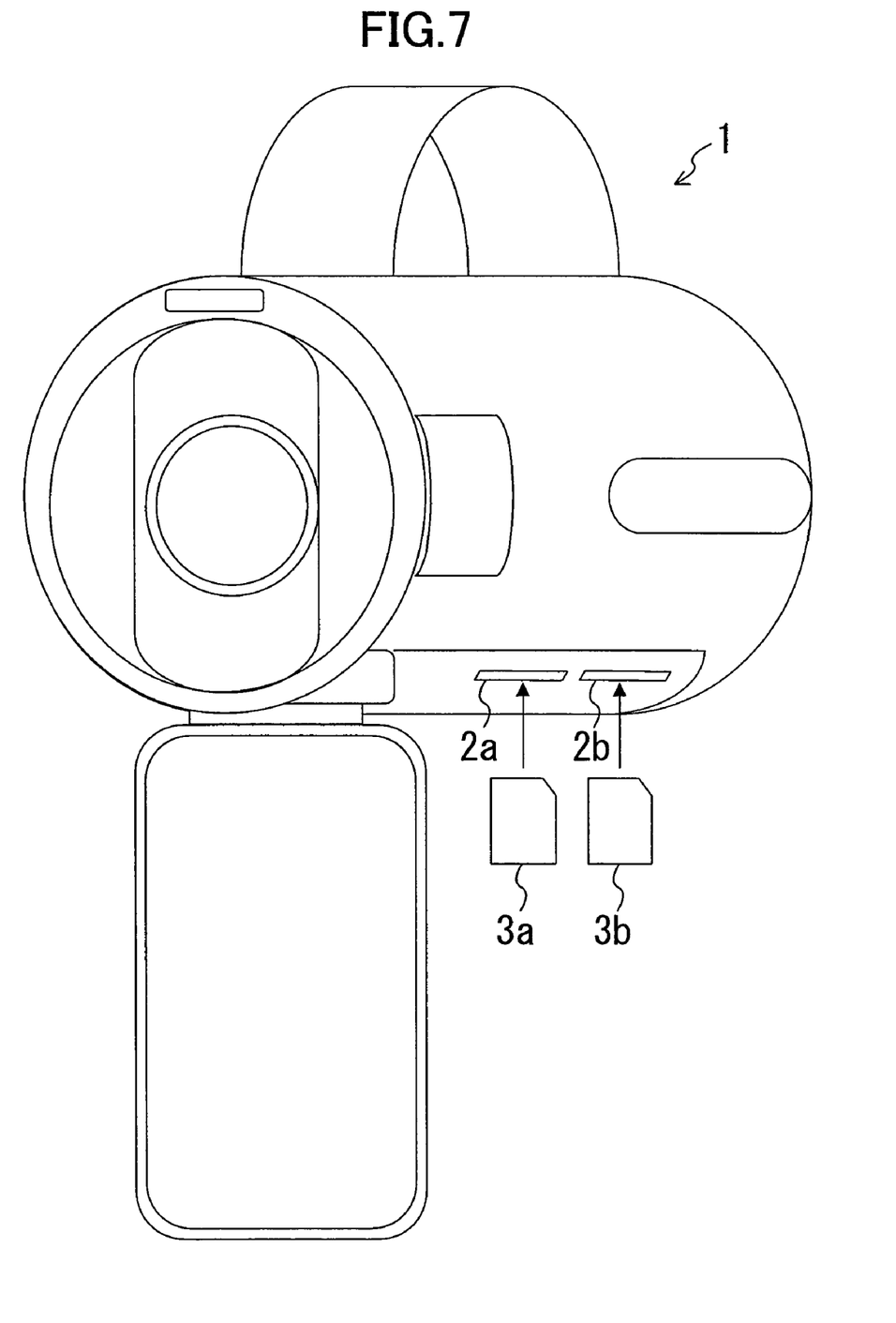
FIG. 7 is an external view of a digital camcorder that is an exemplary host apparatus according to the present invention.

FIG. 7 is an external view of a digital camcorder that is an exemplary host apparatus according to the present invention. The digital camcorder 1 of FIG. 7 comprises two card slots 2*a* and 2*b*. Recorded data can be written into memory cards 3*a* and 3*b* inserted in the card slots 2*a* and 2*b*.

Although it has been assumed in Embodiments 1 and 2 above that only the card initialization process is performed as a preliminary process that are divided into a plurality of unit processes for execution, other processes, such as a FAT reading process and the like may be similarly divided for execution. Thereby, a write interrupt time can be further reduced, so that the size of a buffer memory can be reduced.

Although it has also been assumed in Embodiments 1 and 2 above that one command is executed in each unit process, the present invention is not limited to this. For example, a plurality of commands may be executed in each unit process.

Although it has also been assumed in Embodiments 1 and 2 above that a common clock line is connected to the card slots, i.e., cannot be switched, a plurality of clock lines may be provided and switched by a selector and clock is not supplied to a card that is not connected, as with the CMD lines and the DAT lines. Note that, in this case, for the ACMD 41 of an SD card, when the card 1 is selected while waiting for BUSY cancellation of the card 2, clock is not supplied to the card 2, so that an initialization process is not executed in the card 2. Therefore, it takes a long time to complete initialization.

Although it has also been assumed in Embodiments 1 and 2 above that a memory card is an SD card, the present invention is not limited to this. For example, a similar effect is obtained for a compact flash card, a SmartMedia card, a memory stick, xD Picture card, and the like.

Although it has also been assumed in Embodiments 1 and 2 above that the new-card preliminary division process is started upon insertion of a new memory card, the present invention is not limited to this. The new-card preliminary division process may be started with any timing if it is a sufficient time before a memory card to which writing is being performed becomes full. For example, after a new memory card is inserted, when the free space of a memory card to which writing is being performed reaches a predetermined level or less, the new-card preliminary division process may be started.

Although, in Embodiment 2 above, only card initialization is considered as a process that is performed without interrupting writing to a memory card, all commands that do not use a DAT line, such as a command CMD 13 for acquiring a card status or the like, can be executed simultaneously with writing by a similar technique.

Although it has also been assumed in Embodiments 1 and 2 above that data generated in an apparatus is written into a memory card, a similar approach is applicable even when data is read out from a memory card and is used in an apparatus. Specifically, a host controller divides a preliminary process for reading a memory card inserted in a card slot into a plurality of unit processes for execution. When a new memory card is inserted during reading of the previous memory card, a new-card preliminary division process including slot switching, execution of a preliminary process corresponding to one unit process, and slot switching, is repeatedly executed. Thereby, the read interrupt time can be distributed, so that the size of a buffer memory for reading data in advance used in during interruption of reading can be reduced. This technique is, for example, useful when moving image data stored in a memory card is reproduced on a host apparatus without interruption.

Also in this case, the new-card preliminary division process may be started upon insertion of a new memory card. Alternatively, the new-card preliminary division process may be started with any timing if it is a sufficient time before the amount of data that has not yet been read out from a memory card that is being read becomes zero. For example, after a new memory card is inserted, when the amount of data that has not yet been read out from a memory card that is being read becomes a predetermined level or less, the new-card preliminary division process may be started.

Although it has also been assumed in Embodiments 1 and 2 above that the number of card slots is two, the present invention is also applicable when the number of card slots is three or more.

The present invention is applicable to a wide variety of host apparatuses that control a plurality of memory cards using a single host controller, and is particularly useful for apparatuses for recording a large amount of data, such as moving images, into a card or cards.

What is claimed is:

1. A host apparatus comprising:
  a host controller;
  a plurality of card slots into each of which a memory card can be inserted; and
  a slot switching section provided between the host controller and the plurality of card slots and for switching a connection destination of a signal line from the host controller, between the plurality of card slots, in accordance with an instruction from the host controller, thereby switching card slots to be a control target,
  wherein the host controller can divide a preliminary process for writing to or reading out from a memory card inserted in the card slot, into a plurality of unit processes for execution, and
  the host controller, when a second memory card, which is different from a first memory card, is inserted into a second card slot while writing or reading is being performed with respect to the first memory card inserted in a first card slot, repeatedly performs a new-card preliminary division process including the steps of:
  (a) switching the control target from the first card slot to the second card slot using the slot switching section;
  (b) executing the unit process of the preliminary process with respect to the second memory card;
  (c) switching the control target from the second card slot to the first card slot using the slot switching section; and
  (d) performing writing or reading with respect to the first memory card.

2. The host apparatus of claim 1, wherein
the slot switching section includes:
  a control selector for switching a connection destination of a control signal line from the host controller, between the plurality of card slots; and
  a data transfer selector for switching a connection destination of a data transfer signal line from the host controller, between the plurality of card slots,
the control selector and the data transfer selector can perform a switching operation independently of each other,
in the new-card preliminary division process executed by the host controller, when the unit process in step (b) does not involve data transfer:
  in step (a), while the connection destination of the data transfer signal line is maintained as the first card slot by the data transfer selector, the connection destination of the control signal line is switched from the first card slot to the second card slot by the control selector; and
  in step (c), the connection destination of the control signal line is switched from the second card slot to the first card slot by the control selector.

3. The host apparatus of claim 1, wherein the preliminary process includes a process of initializing the memory card.

4. The host apparatus of claim 1, wherein each unit process obtained by dividing the preliminary process is a process of executing one command.

5. The host apparatus of claim 1, wherein the host controller starts execution of the new-card preliminary division process upon insertion of a the second memory card into the second card slot.

6. The host apparatus of claim 1, wherein the host controller starts execution of the new-card preliminary division process after insertion of the second memory card into the second card slot and when a free space of the first memory card in the first card slot or an amount of data that has not yet been read out from the first memory card in the first card slot reaches a predetermined level or less.

7. The host apparatus of claim 1, wherein the host apparatus is a digital camcorder.

* * * * *